United States Patent
Krisher

(10) Patent No.: US 8,118,571 B2
(45) Date of Patent: Feb. 21, 2012

(54) ACTUATOR ASSEMBLY

(75) Inventor: James A. Krisher, Fort Wayne, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 1716 days.

(21) Appl. No.: 11/094,581

(22) Filed: Mar. 31, 2005

(65) Prior Publication Data
US 2006/0228236 A1 Oct. 12, 2006

(51) Int. Cl.
*F04B 9/00* (2006.01)

(52) U.S. Cl. ......... 417/415; 417/318; 417/321; 417/339

(58) Field of Classification Search .... 74/25; 192/85 C; 417/321, 415, 318, 339, 375, 379, 380, 390, 417/405; 60/545, 588; 91/61; 92/31, 136; 188/72.6, 77.6, 156, 157
See application file for complete search history.

(56) References Cited

U.S. PATENT DOCUMENTS

| | | | |
|---|---|---|---|
| 3,808,947 A | | 5/1974 | Simmons et al. |
| 3,872,772 A | | 3/1975 | Walters |
| 4,653,815 A | | 3/1987 | Agarwal et al. |
| 5,385,394 A | * | 1/1995 | Leppek et al. ............. 303/115.2 |
| 5,934,432 A | * | 8/1999 | Bates ......................... 192/85 C |
| 5,944,159 A | * | 8/1999 | Schneider et al. .......... 192/85 C |
| 5,950,427 A | | 9/1999 | Demerjian, Jr. et al. |
| 6,230,492 B1 | | 5/2001 | Kingston et al. |
| 6,305,758 B1 | | 10/2001 | Hageman et al. |
| 6,352,018 B1 | | 3/2002 | Krisher |
| 6,575,264 B2 | | 6/2003 | Spadafora |
| 6,578,933 B2 | * | 6/2003 | Hageman et al. .......... 303/119.1 |
| 6,655,138 B2 | | 12/2003 | Shaw et al. |
| 6,729,450 B1 | | 5/2004 | Albert et al. |
| 6,758,041 B2 | * | 7/2004 | Bishop et al. ................... 60/545 |
| 2002/0162328 A1 | | 11/2002 | Shaw et al. |
| 2003/0201145 A1 | * | 10/2003 | Bansbach et al. .......... 192/85 C |
| 2004/0177612 A1 | | 9/2004 | Geiger |

* cited by examiner

*Primary Examiner* — Devon C Kramer
*Assistant Examiner* — Leonard Weinstein
(74) *Attorney, Agent, or Firm* — Marshall & Melhorn LLC

(57) ABSTRACT

An actuator assembly for generating a fluid pressure and applying the fluid pressure to a first device. The actuator assembly comprises a first fluid chamber and a first piston disposed adjacent to the first fluid chamber, a second fluid chamber and a second piston slidably received in the second fluid chamber, a fluid passage connecting the first fluid chamber with the second fluid chamber, and an actuator motor for selectively reciprocating the first piston so that axial movement of the first piston generates a fluid pressure within the first fluid chamber. The first piston is disposed within the actuator motor. As the first chamber is fluidly communicating with the second fluid chamber, the linear motion of the first piston causes corresponding linear motion of the second piston for applying the fluid pressure to the first device.

20 Claims, 3 Drawing Sheets

ACTUATOR ASSEMBLY

BACKGROUND OF THE INVENTION

1. Field of the Invention

The present invention relates to actuators in general, and more particularly to an actuator assembly including a fluid pressure generating piston assembly disposed in an actuator motor.

2. Description of the Prior Art

Fluid actuators are widely employed in various applications as a source of a pressurized hydraulic fluid, such as friction clutch assemblies and hydraulic brake systems. Especially popular are hydraulic actuators driven by an electric motor. These actuators, typically, include a motor driven screw shaft, a non-rotatable nut threaded to the screw shaft, and a hydraulic piston slidably mounted within a hydraulic cylinder and fixed to the nut. When the electric motor is actuated, the rotary motion of the screw shaft is transmitted to the nut that linearly travels along the screw shaft. Since the piston is fixed to the nut, it also moves along the screw shaft, thus generating a desired hydraulic pressure.

While known fluid actuators, including but not limited to those discussed above, have proven to be acceptable for various applications, such actuators are nevertheless susceptible to improvements that may reduce their size and enhance packaging. With this in mind, a need exists to develop improved fluid actuators that advance the art.

SUMMARY OF THE INVENTION

The present invention provides an improved fluid actuator assembly for generating a fluid pressure and applying the fluid pressure to a first device actuated in response to a fluid pressure applied thereto. The fluid actuator assembly of the present invention comprises a first fluid chamber and a first piston disposed adjacent to the first fluid chamber, a second fluid chamber and a second piston slidably received in the second fluid chamber, and an actuator motor for selectively reciprocating the first piston so that axial movement of the first piston generates a fluid pressure within the first fluid chamber. The first piston is disposed within the actuator motor. The first fluid chamber and the second fluid chamber are fluidly connected by a fluid passage so that linear motion of the first piston causes corresponding linear motion of the second piston in the second chamber for applying the fluid pressure to the first device.

The actuator assembly in accordance with the present invention provides an exceptionally compact source for hydraulic fluid pressure in a convenient packaging.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
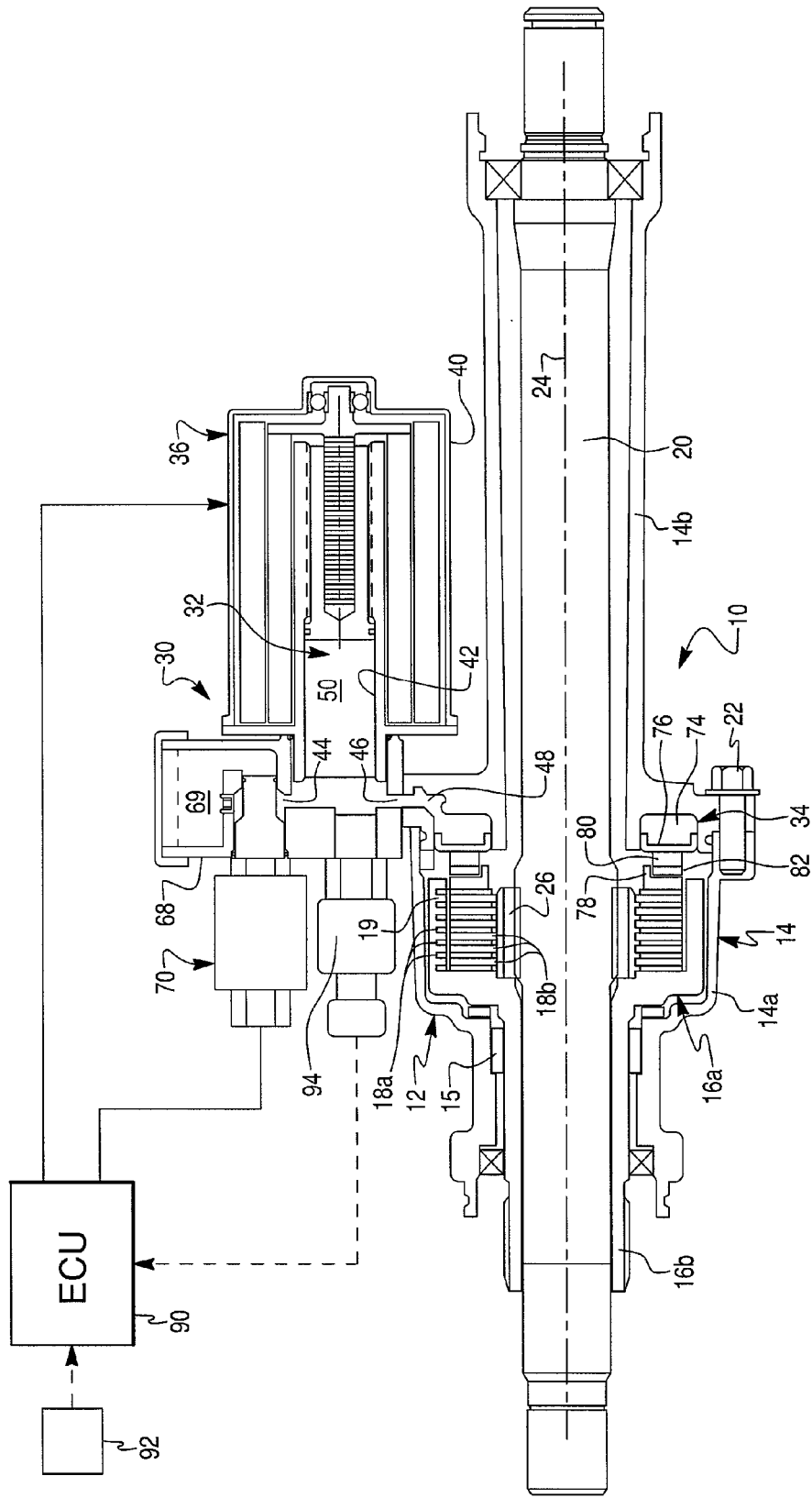
FIG. 1 is a sectional view of a torque coupling apparatus in accordance with the preferred embodiment of the present invention.

FIG. 1 of the drawings illustrates a torque coupling apparatus 10 in accordance with a first exemplary embodiment of the present invention. As illustrated, the torque coupling apparatus 10 comprises a first device in the form of a friction clutch assembly 12 and a fluid actuator assembly 30 provided for selectively actuating the friction clutch assembly 12.

Preferably, the friction clutch assembly 12 is rotatably supported within a coupling housing 14 through anti-friction bearing 15 for rotation about a longitudinal axis 24. The friction clutch assembly 12 includes an input member in the form of a clutch carrier member 16, and output member in the form of a drive shaft 20, and a clutch pack 18 defined by two sets of alternating outer, or first, friction clutch members 18a and inner, or second, friction clutch members 18b. The coupling housing 14 includes a clutch housing 14a rotatably supporting the clutch carrier member 16 and the friction clutch members 18a and 18b, and a shaft housing 14b rotatably supporting the drive shaft 20 and secured to the clutch housing 14a through a set of fasteners 22 (only one shown in FIG. 1) to form the coupling housing 14.

The clutch carrier member 16 has a drum portion 16a housing the friction members 18a and 18b, and a sleeve portion 16b drivingly connected to a source of an outside torque, preferably through a spline connection. Conventionally, an outer circumference of the outer friction members 18a is provided with projections that non-rotatably engage corresponding grooves 19 formed in an inner peripheral surface of the drum portion 16a of the clutch carrier member 16. Thus, the outer friction members 18a are axially slidably, but non-rotatably coupled to the input member 16. The inner friction members 18b are splined to an annular adaptor ring 26, which, in turn, is splined to the output axle shaft 20, thus axially slidably, but non-rotatably coupling the inner friction members 18b to the output member 20. The friction members 18a and 18b are mounted substantially coaxially to the axis 24. In other words, the input member 16 is mounted substantially coaxially with the output member 20.

The fluid actuator assembly 30, according to the first exemplary embodiment of the present invention, comprises a first piston assembly 32, a second piston assembly 34 in fluid communication with the first piston assembly 32, and an actuator motor 36 associated with the first piston assembly 32 for selectively generating fluid pressure within the first piston assembly 32. The first piston assembly 32 is disposed within the actuator motor 36. Such an arrangement integrating the first piston assembly 32 into the actuator motor 36 minimizes the size of the actuator assembly 30. Preferably, the actuator motor 36 is in the form of a reversible electric motor, as the electric motor is compact and easily controllable. It will be appreciated that any other appropriate type of the actuator motor, such as hydraulic or pneumatic, are within the scope of the present invention.

Referring again to FIG. 1, reference numeral 40 defines an actuator housing including a substantially cylindrical outer casing 40a and an inner tubular member 40b secured to each other by any appropriate means known in the art, such as by threaded fasteners (not shown). The actuator housing 40 is also provided with an end member 41 secured to the inner tubular member 40b thereof by any appropriate means known in the art. The inner tubular member 40b of the actuator housing 40 includes a central, axial bore 42 therein. Preferably, the axial bore 42 is substantially cylindrical and has a central axis 37 coinciding with an axis of rotation of the actuator motor 36. As illustrated in detail in FIG. 2, the axial bore 42 houses the first piston assembly 32 that includes a first fluid chamber 50 defined within the axial bore 42 and a first piston 52 slidingly disposed within the first fluid chamber 50 for linear reciprocating motion therewithin. The first piston 52 of the first piston assembly 32 includes a piston head 54 received in the first fluid chamber 50 and a tubular stem 56 slidingly supported in the axial bore 42. As further illustrated in FIGS. 1 and 2, the end member 41 has an inlet opening 44 and an outlet opening 46 both in fluid communication with the first fluid chamber 50. The actuator housing 40 is attached to the coupling housing 14 by any appropriate manner known in the art, such as by threaded fasteners (not shown).

The output of the electrical actuator motor 36 is drivingly connected to a drive screw 58. The drive screw 58 is disposed inside the tubular stem 56 of the first piston 52 coaxially therewith. Moreover, the drive screw 58 is operatively connected to the tubular stem 56 of the first piston 52 so that a rotational movement of the drive screw 58 is transformed to a linear motion of the first piston 52. Preferably, the tubular stem 56 of the first piston 52 is threadably engaged with the drive screw 58 through a conventional ball-screw mechanism (not shown) well known to those skilled in the art.

Figure 2:
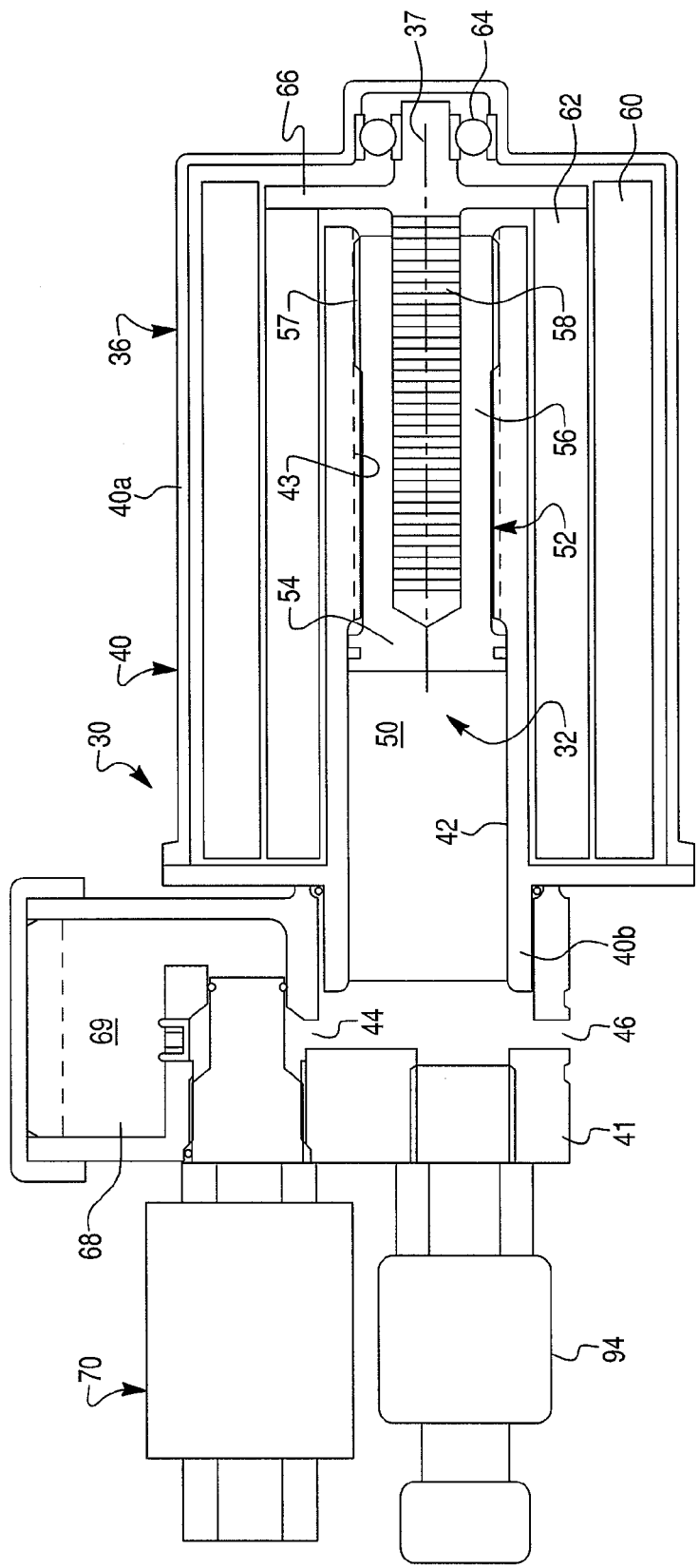
FIG. 2 is an enlarged sectional view of a fluid actuator assembly in accordance with the first exemplary embodiment of the present invention.

Further preferably, the first piston 52 is non-rotatably linearly driven by the drive screw 58. According to the preferred embodiment of the present invention, this is achieved by providing a portion of an inner peripheral surface of the bore 42 of the housing 40 with splines 43 engaging corresponding external splines 57 formed on at least a portion of the tubular stem 56 of the first piston 52, as shown in FIG. 2. Thus, the first piston 52 is prevented from rotating while allowed to move linearly within the bore 42.

Alternatively, the bore 42 may be provided with a groove (not shown) along the axial direction of the drive screw 58 for receiving a key element (not shown) extending radially outwardly from the tubular stem 56 of the first piston 52 to prevent the first piston 52 from rotating when the drive screw 58 rotates. Such arrangement is well known in the art. Those of ordinary skill in the art will appreciate that there are many other equivalent means that could be used for the same purpose.

The electrical actuator motor 36 includes a stator 60 in the form of a fixed electro-magnetic coil and a rotor 62 in the form of permanent magnets. The rotor 62 is rotatably supported in the outer casing 40a of the actuator housing 40 by a roller bearing 64. Moreover, the rotor 62 is drivingly connected to the drive screw 58 through a flange member 66 of the drive screw 58. In operation, when the electric motor 36 is energized, the rotor 62 rotates, resulting in rotation of the drive screw 58. Rotation of the drive screw 58 results in the axial linear movement of the first piston 52. In turn, the axial linear movement of the first piston 52 results in increasing or decreasing hydraulic fluid pressure, dependent upon the direction of the axial movement of the first piston 52. Preferably, the electrical actuator motor 36 can be driven both forward and reverse to provide a variable hydraulic fluid pressure, resulting in controllable torque transfer across the friction clutch assembly 12.

The fluid actuator assembly 30 further comprises a fluid reservoir 68 and a normally-open solenoid valve 70. The fluid reservoir 68 is provided for storing a fluid, such as a hydraulic fluid 69 (oil or the like), at atmospheric pressure. Preferably, the fluid reservoir 68 is integrally formed in the end member 41. The first fluid chamber 50 is fluidly connected to the fluid reservoir 68 through the inlet opening 44 in the end member 41 of the actuator housing 40. The inlet opening 44 is selectively controlled by the solenoid valve 70. The fluid reservoir 68 and the solenoid valve 70 are provided to add the hydraulic fluid 69 to the first fluid chamber 50 as required to compensate for friction clutch wear. The solenoid valve 70 also functions as a redundant safety feature, permitting the release of fluid pressure from the first fluid chamber 50 if the fluid pressure within the first fluid chamber 50 exceeds a predetermined value, and unloading of the clutch pack 18.

As further illustrated in FIG. 1, the second piston assembly 34 that includes a second fluid chamber 74 and a second piston 76 slidingly disposed within the second fluid chamber 74 for linear reciprocating motion therewithin. The second fluid chamber 74 is formed within the shaft housing 14b of the coupling housing 14. The second fluid chamber 74 is fluidly connected to the first fluid chamber 50 through a communication fluid passage 48 and the outlet opening 46 in the end member 41 of the actuator housing 40. Preferably, the communication passage 48 is formed within the shaft housing 14b of the coupling housing 14.

The second piston assembly 34 is provided for axially compressing the clutch pack 18 for frictionally engaging the friction clutch assembly 12. In order to realize this function, the torque coupling apparatus 10 further includes a pressure collar 78 non-rotatably engaging the drum portion 16a of the clutch carrier member 16, a pressure plate 80 juxtaposed to the second piston 76, and a axial thrust bearing 82 is provided between the pressure collar 78 and the pressure plate 80 to reduce the friction as the pressure collar 78 rotates relative to the pressure plate 80 about the axis 24. More specifically, the pressure collar 78 is provided with projections that non-rotatably engage corresponding grooves 19 formed in the inner peripheral surface of the drum portion 16a of the clutch carrier member 16 so that the pressure collar 78 is axially slidable, but non-rotatably coupled to the input member 16.

When the actuator assembly 30 is inactive the solenoid valve 70 is open, air is free to bleed from various fluid cavities into the fluid reservoir 68, and the hydraulic fluid 69 can drain from the fluid reservoir 68 to completely fill the first fluid chamber 50.

In operation, when the actuator assembly 30 is energized, the solenoid valve 70 closes, preventing the hydraulic fluid flow in to and out of the fluid reservoir 68. As the drive screw 58 begins to rotate, the first piston 52 is moved axially, compressing the hydraulic fluid 69 in the first fluid chamber 50. The hydraulic fluid flows from the first fluid chamber 50 through the outlet opening 46 and the communication passage 48 into the second fluid chamber 74. Once a clutch pack end play is eliminated, the hydraulic fluid becomes pressurized, applying an axial load on the clutch pack 18 through the second piston assembly 34. More specifically, as the hydraulic fluid becomes pressurized, the second piston 76 axially moves toward the clutch pack 18. The axial movement of the second piston 76 is transmitted to the pressure collar 78 engaging the friction members 18a and 18b, through the axial thrust bearing 82 and the pressure plate 80, and causes the pressure collar 78 to frictionally load the clutch assembly 12. Thus, the engagement of the clutch pack 18 depends upon the operation of the electric motor 36.

The torque capacity of the clutch pack 18 is proportional to the hydraulic fluid pressure applied to the second piston 76. A small amount of torque generated by the electric motor 36 results in a significant amount of force on the second piston 76. Torque amplification is realized by the lead of the motor drive screw 58, while force amplification is realized by the ratio of a surface area of the piston head 54 of the first piston 52 to a surface area of the second piston 76. The hysteresis effect of the torque coupling apparatus 10 is minimal, resulting from friction attributed to piston seals, the drive screw thread, the first piston spline teeth, and ball bearing rotation.

As further illustrated in FIG. 1, the electric motor 36 of the actuator assembly 30, thus the torque coupling apparatus 10, is controlled by an electronic control unit (ECU) 90. The ECU 90 also controls the solenoid valve 70. The control is carried out according to at least one operating parameter of machinery employing the torque coupling apparatus 10 of the present invention, inputted into the ECU 90 from at least one sensor 92.

For example, if the fluid actuator assembly 30 is provided for applying fluid pressure to the friction clutch assembly 12 in a torque coupling apparatus for a motor vehicle transaxle, then The torque coupling apparatus 10 further includes a fluid pressure sensor 94 provided to sense a hydraulic fluid pressure within the first fluid chamber 50 and supply a pressure signal to the ECU 90. The ECU 90 then operates the electric motor 36. Therefore, by monitoring pressure at the fluid pressure sensor 94, the electric motor 36 can be controlled to modulate the hydraulic fluid pressure generated by the actuator assembly 30, thus the torque of the friction clutch assembly 12, as required to provide a desired clutch torque capacity. More specifically, the amount of pressure that acts on the second piston 76 may be controlled by varying the hydraulic fluid pressure generated by the actuator assembly 30. In this manner, the hydraulic fluid pressure acting to the second piston 76 may be infinitely varied. Such an arrangement of the torque coupling apparatus 10 allows the torque capacity of the clutch assembly 12 to be actively controlled electronically. Preferably, the fluid pressure sensor 94 is mounted to the end member 41 of the actuator housing 40 so as to be in fluid communication with the first fluid chamber 50.

Furthermore, if the fluid pressure sensor 94 senses that hydraulic fluid pressure within the first fluid chamber 50 exceeds the predetermined value, the ECU 90 commands to the solenoid valve 70 to open, thus releasing the hydraulic fluid from the first fluid chamber 50 to the fluid reservoir 68.

Although in the exemplary embodiment according the present invention the fluid actuator assembly 30 is provided for applying fluid pressure to the friction clutch assembly 12, one of ordinary skill in the art would appreciate that the fluid actuator assembly 30 of the present invention may be employed in any other appropriate fluidly actuated devices. In other words, the first device may be any device requiring a source of pressurized hydraulic fluid, including but not limited to a fluid brake system, an ABS modulator, a torque coupling apparatus for a vehicle transfer case or a vehicle transaxle, a limited-slip differential, etc. Moreover, the pressurized fluid from the actuator assembly 30 can be provided to more than one device.

Figure 3:
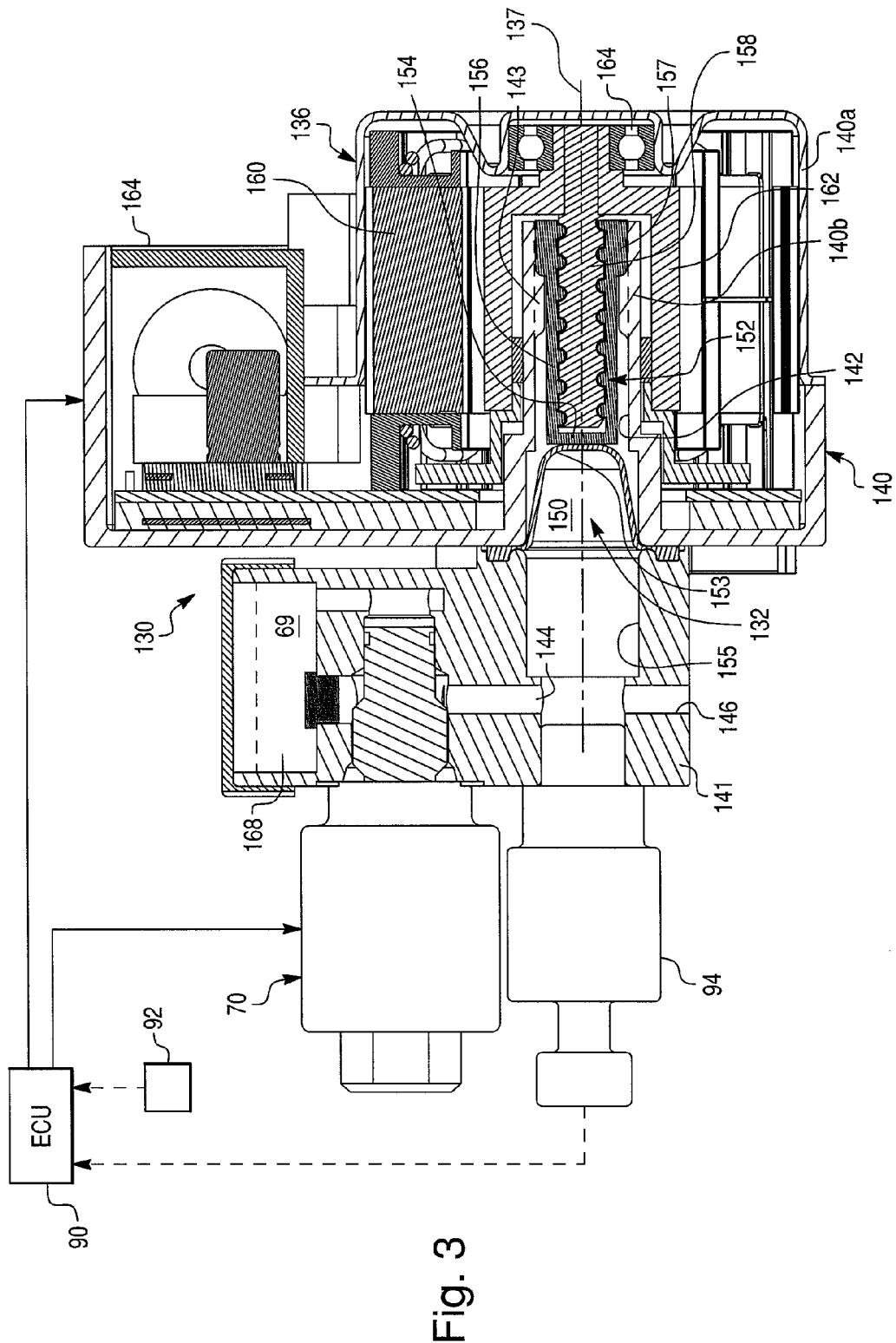
FIG. 3 is an enlarged sectional view of a fluid actuator assembly in accordance with the second exemplary embodiment of the present invention.

FIG. 3 of the drawings shows a partial sectional view of a second exemplary embodiment of a fluid actuator assembly, depicted with the reference numeral 130. Components, which are unchanged from, or function in the same way as in the exemplary embodiment depicted in FIGS. 1 and 2 are labeled with the same reference characters. The fluid actuator assembly 130 of FIG. 3 substantially corresponds to the fluid actuator assembly 30 of FIGS. 1 and 2, and only the portions of the first piston assembly and the actuator motor, which differ, will therefore be explained in detail below, sometimes without describing detail since similarities between the corresponding parts in the two embodiments will be readily perceived by the reader.

More specifically, according to the second exemplary embodiment of the present invention illustrated in FIG. 3, the fluid actuator assembly 130 comprises a first piston assembly 132, a second piston assembly 34 (as illustrated in FIG. 1 and described above) in fluid communication with the first piston assembly 132, and an actuator motor 136 associated with the first piston assembly 132 for selectively generating fluid pressure within the first piston assembly 132. The first piston assembly 132 is disposed within the actuator motor 136. Preferably, the actuator motor 136 is in the form of a reversible electric motor. It will be appreciated that any other appropriate type of the actuator motor, such as hydraulic or pneumatic, are within the scope of the present invention.

Referring again to FIG. 3, reference numeral 140 defines an actuator housing including a substantially cylindrical outer casing 140a and an inner tubular member 140b connected to each other by any appropriate means known in the art.

The inner tubular member 140b of the actuator housing 140 is provided with a central, axial bore 142 therein. Preferably, the axial bore 142 is substantially cylindrical, stepped bore and has a central axis 137 coinciding with an axis of rotation of the actuator motor 136.

As further shown in FIG. 3, the first piston assembly 132 includes a first fluid chamber 150 defined within the axial bore 142, a first piston 152 slidingly disposed within the axial bore 142 for linear reciprocating motion therewithin, and a cup-shaped flexible diaphragm 153 separating the first piston 152 from the first fluid chamber 150. As illustrated, volume within the cup-shaped flexible diaphragm 153 defines the first fluid chamber 150 of the first piston assembly 132. The flexible diaphragm 153 is made of any appropriate flexible material, such as rubber, plastic, etc.

The actuator housing 140 is provided with an end member 141 secured to the inner tubular member 140b thereof by any appropriate means known in the art. The end member 141 includes an axial bore 155 formed therein. As illustrated in FIG. 3, the axial bore 155 is in fluid communication with the first fluid chamber 150. Moreover, the axial bore 142 has an inlet opening 144 and an outlet opening 146 open to the communication fluid passage 48 for fluidly connecting the first fluid chamber 150 with the second fluid chamber 74 shown in FIG. 1.

The first piston 152 of the first piston assembly 132 includes a piston head 154 adjacent to the flexible diaphragm 153 and a tubular stem 156 slidingly supported in the axial bore 142. More specifically, the tubular stem 156 is slidingly supported in the axial bore 142 in the inner tubular member 140b of the actuator housing 140.

The output of the electrical actuator motor 136 is drivingly connected to a drive screw 158. The drive screw 158 is disposed inside the tubular stem 156 of the first piston 152 coaxially therewith. Moreover, the drive screw 158 is operatively connected to the tubular stem 156 of the first piston 152 so that a rotational movement of the drive screw 158 is transformed to a linear motion of the first piston 152. Preferably, the tubular stem 156 of the first piston 152 is threadably engaged with the drive screw 158 through a conventional ball-screw mechanism (not shown) well known to those skilled in the art.

Further preferably, the first piston 152 is non-rotatably linearly driven by the drive screw 158. According to the preferred embodiment of the present invention, this is achieved by providing a portion of an inner peripheral surface of the bore 142 of the housing 140 with splines 143 engaging corresponding external splines 157 formed on at least a portion of the tubular stem 156 of the first piston 152, as shown in FIG. 3. Thus, the first piston 152 is prevented from rotating while allowed to move linearly within the bore 142.

Alternatively, the bore 142 may be provided with a groove (not shown) along the axial direction of the drive screw 158 for receiving a key element (not shown) extending radially outwardly from the tubular stem 156 of the first piston 152 to prevent the first piston 152 from rotating when the drive screw 158 rotates. Such arrangement is well known in the art. Those of ordinary skill in the art will appreciate that there are many other equivalent means that could be used for the same purpose.

The electrical actuator motor 136 includes a stator 160 in the form of a fixed electro-magnetic coil, a rotor 162 in the form of permanent magnets, and a motor controller 165. The rotor 162 is rotatably supported in the outer casing 140a of the actuator housing 140 by a roller bearing 164. Moreover, the rotor 162 is drivingly connected to the drive screw 158. In operation, when the electric motor 136 is energized, the rotor 162 rotates, resulting in rotation of the drive screw 158. Rotation of the drive screw 158 results in the axial linear movement of the first piston 152. In turn, the first piston 152 deforms and bends the flexible diaphragm 153 that results in increasing or decreasing hydraulic fluid pressure, dependent upon the direction of the axial movement of the first piston 152. Preferably, the electrical actuator motor 136 can be driven both forward and reverse to provide a variable hydraulic fluid pressure, resulting in controllable torque transfer across the friction clutch assembly 12 (shown in FIG. 1).

The fluid actuator assembly 130 further comprises a fluid reservoir 168 and a normally-open solenoid valve 70. The fluid reservoir 168 is provided for storing a fluid, such as a hydraulic fluid 69 (oil or the like), at atmospheric pressure. According to the second exemplary embodiment of the present invention, the fluid reservoir 168 is integrally formed in the end member 141.

The first fluid chamber 150 is fluidly connected to the fluid reservoir 168 through the inlet opening 144 in the axial bore 155 of the end member 141. The inlet opening 144 is selectively controlled by the solenoid valve 70. The fluid reservoir 168 and the solenoid valve 70 are provided to add the hydraulic fluid 69 to the first fluid chamber 150 as required to compensate for friction clutch wear. The solenoid valve 70 also functions as a redundant safety feature, permitting the release of fluid pressure from the first fluid chamber 150 if the fluid pressure within the first fluid chamber 150 exceeds a predetermined value, and unloading of the clutch pack 18.

The fluid actuator assembly 130 further includes a fluid pressure sensor 94 provided to sense a hydraulic fluid pressure within the first fluid chamber 150 and supply a pressure signal to the ECU 90. The ECU 90 then operates the electric motor 136 through the motor controller 165. Therefore, by monitoring pressure at the fluid pressure sensor 94, the electric motor 136 can be controlled to modulate the hydraulic fluid pressure generated by the actuator assembly 130, thus the torque of the friction clutch assembly 12, as required to provide a desired clutch torque capacity. Alternatively, the ECU 90 may be integrated with the motor controller 165.

The operation of the torque coupling apparatus 10 with the actuator assembly 30 according to the first exemplary embodiment of the present invention is substantially similar to the operation of the torque coupling apparatus 10 with the actuator assembly 130 according to the second exemplary embodiment of the present invention.

Therefore, the actuator assembly in accordance with the present invention represents a novel arrangement of the fluid actuator that provides an exceptionally compact power source for hydraulic fluid pressure in a convenient packaging.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A fluid actuator assembly comprising:
a first fluid chamber and a first piston disposed adjacent to said first fluid chamber;
a second fluid chamber and a second piston slidably received in said second fluid chamber;
an actuator motor for selectively reciprocating said first piston so that axial movement of said first piston generates a fluid pressure within said first fluid chamber, said first piston disposed within said actuator motor; and
a fluid passage connecting said first fluid chamber with said second fluid chamber so that linear motion of said first piston causes corresponding linear motion of said second piston for applying the fluid pressure to a first device.

2. The fluid actuator assembly as defined in claim 1, wherein said actuator motor is a reversible electric motor.

3. The fluid actuator assembly as defined in claim 1, further comprising an actuator housing provided with an axial bore therein; said axial bore receives said first piston and defines said first fluid chamber.

4. The fluid actuator assembly as defined in claim 3, wherein said actuator motor is mounted about said axial bore substantially coaxially therewith.

5. The fluid actuator assembly as defined in claim 3, further comprising a drive screw mounted within said axial bore in said actuator housing and drivingly connected to said actuator motor; said drive screw is operatively connected to said first piston so that a rotational movement of said drive screw is transformed to a linear motion of said first piston.

6. The fluid actuator assembly as defined in claim 5, wherein said actuator motor is a reversible electric motor; and wherein said drive screw is drivingly connected to a rotor of said electric motor.

7. The fluid actuator assembly as defined in claim 6, wherein said rotor is mounted substantially coaxially with said axial bore.

8. The fluid actuator assembly as defined in claim 1, wherein said first piston is non-rotatably coupled to said actuator housing within said axial bore.

9. The fluid actuator assembly as defined in claim 1, further comprising a fluid reservoir fluidly connected to said first fluid chamber to provide hydraulic fluid thereto.

10. The fluid actuator assembly as defined in claim 9, wherein said fluid reservoir is provided for storing hydraulic fluid at atmospheric pressure.

11. The fluid actuator assembly as defined in claim 9, further comprising a normally-open valve controlling fluid communication between said fluid reservoir and said first fluid chamber; said normally-open valve closes when said actuator motor is energized.

12. The fluid actuator assembly as defined in claim 11, wherein said normally-open valve opens when fluid pressure within said first fluid chamber exceeds a predetermined value.

13. The fluid actuator assembly as defined in claim 12, wherein said normally-open valve is a solenoid valve.

14. The fluid actuator assembly as defined in claim 13, further comprising a fluid pressure sensor monitoring a fluid pressure within said first fluid chamber and an electronic control unit provided for selectively controlling said solenoid valve based on a fluid pressure signal from said fluid pressure sensor.

15. The fluid actuator assembly as defined in claim 1, further comprising a fluid pressure sensor monitoring a fluid pressure within said first fluid chamber and an electronic control unit provided for selectively controlling said actuator motor based on a fluid pressure signal from said fluid pressure sensor.

16. The fluid actuator assembly as defined in claim 1, further comprising at least one sensor monitoring at least one operating parameter of a machinery employing said first device and an electronic control unit provided for selectively controlling said actuator motor based on a signal from said at least one sensor.

17. The fluid actuator assembly as defined in claim 16, wherein said first device is one of a clutch assembly and a brake assembly; and wherein said machinery employing said first device is a motor vehicle.

18. The fluid actuator assembly as defined in claim 1, further including a flexible diaphragm separating said first fluid chamber from said first piston.

19. The fluid actuator assembly as defined in claim 1, wherein said first piston is disposed in said first fluid chamber.

20. The fluid actuator assembly as defined in claim 1, wherein said first device is a clutch assembly or a brake assembly.

* * * * *